US009390517B2

(12) United States Patent
Kwon et al.

(10) Patent No.: US 9,390,517 B2
(45) Date of Patent: Jul. 12, 2016

(54) SYSTEM FOR IMAGE ANALYSIS AND METHOD THEREOF

(75) Inventors: Youngil Kwon, Yongin-si (KR); Byoungkuk Kim, Yongin-si (KR); Jinseo Park, Yongin-si (KR); Taewon Kim, Yongin-si (KR); Youngseok Song, Yongin-si (KR); Inhwan Sul, Yongin-si (KR); Kiyeon Jo, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 1211 days.

(21) Appl. No.: 13/355,358

(22) Filed: Jan. 20, 2012

(65) Prior Publication Data

US 2012/0188361 A1  Jul. 26, 2012

(30) Foreign Application Priority Data

Jan. 25, 2011 (KR) .................. 10-2011-0007283
Dec. 2, 2011 (KR) .................. 10-2011-0128671

(51) Int. Cl.
*G06T 7/40* (2006.01)
*H04N 7/18* (2006.01)

(52) U.S. Cl.
CPC ....... *G06T 7/401* (2013.01); *G06T 2207/10056* (2013.01); *G06T 2207/10061* (2013.01); *G06T 2207/30121* (2013.01)

(58) Field of Classification Search
CPC .......... G01N 2500/10; G01N 15/1475; G01N 21/658; G01N 21/6458; G06T 2207/10056; G06T 2207/10061
See application file for complete search history.

(56) References Cited

U.S. PATENT DOCUMENTS 8,586,142 B2* 11/2013 Himmelhaus ......... C23C 14/042
427/248.1
2007/0016373 A1* 1/2007 Hunter ............... G01N 15/1475
702/19
2009/0225310 A1* 9/2009 Yang ..................... G01N 21/658
365/301
2010/0211366 A1* 8/2010 Ichishima ............. G06F 19/701
703/6
2010/0250219 A1* 9/2010 Heinz ................... G06F 19/701
703/12

FOREIGN PATENT DOCUMENTS

JP    06-050939 A    2/1994
JP    2005-121479 A   5/2005

OTHER PUBLICATIONS

"Quantitative Determination of Particle Dispersion in a Paint Film" by Michael P. Diebold et al., http://www.fcimag.com/copyright/d7e84685af6a7010VgnVCM100000f932a8c0. Posted: Oct. 1, 2005.*

(Continued)

*Primary Examiner* — Mehrdad Dastouri
*Assistant Examiner* — Obafemi Sosanya
(74) *Attorney, Agent, or Firm* — Knobbe, Martens, Olson & Bear, LLP

(57) ABSTRACT

A system for image analysis and a method thereof are disclosed. In one embodiment, the system includes a detector configured to receive an image of a sample, isolate particles from a background image of the sample image and detect positions of the isolated particles and a first operator configured to calculate a static degree of randomness values of the particles using Lennard-Jones potentials based on the detected positions. The system may further include a second operator configured to obtain a dynamic degree of randomness values of particles based at least in part on the sum of tensile forces between particles by implicit integration added until the particles reach a dynamic equilibrium, and calculate a positional degree of randomness of particles based at least in part on subtraction of the dynamic degree of randomness values from the static degree of randomness values.

20 Claims, 9 Drawing Sheets

(56) References Cited

OTHER PUBLICATIONS

Diebold et al., "Quantitative Determination of Particle Dispersion in a Paint Film", presented at the 8th Nürnberg Congress, Creative Advances in Coatings Technology, Apr. 2005 in Nürnberg, Germany, DuPont Titanium Technologies, Wilmington, DE, Posted Oct. 1, 2005, pp. 1-9.

"Haze", HunterLab, Insight on Color, Applications Note, vol. 9, No. 6, pp. 1-4, Jun. 2008.

* cited by examiner (a)

(b)

(a)　　　　　　　　　　(b)

(a)          (b)          (c)          (d)

S700

SYSTEM FOR IMAGE ANALYSIS AND METHOD THEREOF

CROSS-REFERENCE TO RELATED APPLICATIONS

This application claims the benefit of Korean Patent Applications No. 10-2011-0007283 filed on Jan. 25, 2011 and 10-2011-0128671 filed on Dec. 2, 2011 the contents of which are incorporated herein by reference in their entirety.

BACKGROUND

1. Field

The described technology generally relates to a system for image analysis and a method thereof.

2. Description of the Related Technology

Surface properties of micro- or nano-sized particles may be considerably affected by a positional degree of randomness (or position distribution). In an anti-glare (AG) film for a liquid crystal display, for example, in order to reduce eye fatigue due to diffuse reflection of light, particles should be uniformly distributed. In the case of paint, color uniformity may be determined by a positional degree of randomness of dye particles.

The positional degree of randomness of particles involves several complicated aspects even if it is simply rendered as 'good' or 'bad.' As an example of bad positional degree of randomness, when an image is globally viewed, particles tend to aggregate in a certain region, and when locally viewed, the particles are not evenly dispersed but aggregate in groups. As an example of a good positional degree of randomness, in both global and local regions of an image, spaces of the global and local regions are uniformly distributed and occupied by all particles.

SUMMARY

One inventive aspect is a system for image analysis and a method thereof, which enable non-destructive measurement of a particle degree of randomness and obtain more objective and accurate measurement results and intuitive analysis results.

Another aspect is a system for image analysis including a detection unit that receives an image of a sample, isolates particles from a background image of the sample image and detects positions of the isolated particles; a first operation unit that calculates static degree of randomness values of the particles using Lennard-Jones potentials based on the positions of the particles detected by the detection unit; and a second operation unit that obtains dynamic degree of randomness values of particles by computing a sum of tensile forces between particles by implicit integration until the particles reach a dynamic equilibrium, and calculates positional degree of randomness of particles by subtracting the dynamic degree of randomness values from the static degree of randomness values.

The system may further include an image acquisition unit for acquiring an image of the sample.

The image acquisition unit may include one of a scanning electron microscope (SEM), an atomic force microscope (AFM) and an optical microscope.

The system may further include a data display unit that displays positional degree of randomness of particles.

The detection unit may obtain Voronoi regions by performing Voronoi Tessellation on the entire region of the sample based on the respective particles, and may obtain a set of pairs of nearest neighbor particles by performing Delaunay triangulation on the Voronoi regions.

The first operation unit calculates energy values of the pairs of neighbor particles based on the Lennard-Jones potential equation $V_{mod}(r)$:

$$V_{mod}(r) = \begin{pmatrix} V_{mod}(R^*), & r < R^* \\ V_{mod}(r), & r \geq R^* \end{pmatrix}$$

where r denotes a distance between the neighbor particles, and $R^*$ denotes a preset threshold value for preventing divergence of the energy values of the neighbor particle pairs.

The first operation unit may obtain a sum of the energy values of neighbor particle pairs as a static degree of randomness value of particles.

The threshold value may be a mean radius value of particles.

In addition, threshold value may be preset to be in a range of $$\frac{\sigma}{8} \text{ to } \frac{\sigma}{2},$$

and σ denotes an equilibrium distance between particles.

The equilibrium distance between particles may be determined based on the following equation:

$$\sigma = \sqrt{\frac{I_{WL} \times I_{HL}}{P_N^2}}$$

where $I_{WL}$ denotes a width size of the sample image, $I_{HL}$ denotes a height size of the sample image and $P_{N^2}$ denotes the number of particles in the sample image.

The second operation unit may define a tensile force ($f^T$) between particles as expressed in the following equations:

$$f^T = k_T(\|x_{ij}\| - l_0)\frac{x_{ij}}{\|x_{ij}\|},$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2},$$

$$\frac{\partial f^T}{\partial v_j} = 0,$$

and may calculate a sum of tensile forces by adopting the equation of the tensile force to the governing equation of implicit integration given below:

$$\left(M - h\frac{\partial f}{\partial v} - h^2\frac{\partial f}{\partial x}\right)\Delta v = h\left(f_0 + h\frac{\partial f}{\partial x}v_0\right)$$

where M denotes a diagonal matrix of 3n×3n having masses of particles as elements, f denotes a 3n×1 vector having forces of particles as elements, v denotes a 3n×1 vector having speeds of particles as elements, x denotes a 3n×1 vector having positions of particles as elements, $l_0$ denotes a equilibrium distance, $k_T$ denotes a spring constant, and h denotes a time step.

Another aspect is a method of image analysis including a detecting step of receiving an image of a sample, isolating particles from a background image of the sample image and detecting positions of the isolated particles; a first operation step of calculating static degree of randomness values of particles using Lennard-Jones potentials based on the positions of the particles in the detecting step; and a second operation step of obtaining dynamic degree of randomness values of particles by computing a sum of tensile forces between particles by implicit integration until the particles reach dynamic equilibrium, and calculates positional degree of randomness of particles by subtracting the dynamic degree of randomness values from the static degree of randomness values.

Before the detecting step, the method may further include an image acquisition step of acquiring the sample image using one of a scanning electron microscope (SEM), an atomic force microscope (AFM) and an optical microscope.

Between the detecting step and the first operation step, the method may further include obtaining Voronoi regions by performing Voronoi Tessellation on the entire region of the sample based on the respective particles; and obtaining a set of pairs of nearest neighbor particles by performing Delaunay triangulation on the Voronoi regions.

The first operation step may include calculating energy values of the pairs of neighbor particles based on the Lennard-Jones potential equation $V_{mod}(r)$:

$$V_{mod}(r) = \begin{pmatrix} V_{mod}(R^*), & r < R^* \\ V_{mod}(r), & r \geq R^* \end{pmatrix}$$

where r denotes a distance between the neighbor particles, and $R^*$ denotes a preset threshold value for preventing divergence of the energy values of the neighbor particle pairs.

The first operation step may include obtaining a sum of the energy values of neighbor particle pairs as a static degree of randomness value of particles.

The threshold value may be a mean radius value of particles.

In addition, the threshold value may be preset to be in a range of $$\frac{\sigma}{8} \text{ to } \frac{\sigma}{2},$$

and σ denotes an equilibrium distance between particles.

The equilibrium distance between particles may be determined based on the following equation:

$$\sigma = \sqrt{\frac{I_{WL} \times I_{HL}}{P_N^2}}$$

where $I_{WL}$ denotes a width size of the sample image, $I_{HL}$ denotes a height size of the sample image and $P_N^2$ denotes the number of particles in the sample image.

The second operation step may include defining a tensile force ($f^T$) between particles as expressed in the following equations:

$$f^T = k_T(\|x_{ij}\| - l_0)\frac{x_{ij}}{\|x_{ij}\|},$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2},$$

$$\frac{\partial f^T}{\partial v_j} = 0,$$

and calculating the sum of the tensile force between particles by adopting the tensile force ($f^T$) to the governing equation of implicit integration given below:

$$\left(M - h\frac{\partial f}{\partial v} - h^2\frac{\partial f}{\partial x}\right)\Delta v = h\left(f_0 + h\frac{\partial f}{\partial x}v_0\right)$$

where M denotes a diagonal matrix of 3n×3n having masses of particles as elements, f denotes a 3n×1 vector having forces of particles as elements, v denotes a 3n×1 vector having speeds of particles as elements, x denotes a 3n×1 vector having positions of particles as elements, $l_0$ denotes a equilibrium distance, $k_T$ denotes a spring constant, and h denotes a time step.

Another aspect is a system for image analysis comprising: a detector configured to receive an image of a sample, isolate particles from a background image of the sample image and detect positions of the isolated particles; a first operator configured to calculate a static degree of randomness values of the particles using Lennard-Jones potentials based on the detected positions; and a second operator configured to obtain a dynamic degree of randomness values of particles based at least in part on the sum of tensile forces between particles by implicit integration added until the particles reach a dynamic equilibrium, and calculate a positional degree of randomness of particles based at least in part on subtraction of the dynamic degree of randomness values from the static degree of randomness values.

The above system further comprises an image acquisition unit configured to acquire an image of the sample. In the above system, the image acquisition unit includes one of a scanning electron microscope (SEM), an atomic force microscope (AFM) and an optical microscope. The above system further comprises a data display configured to display a positional degree of randomness of particles. In the above system, the detector is configured to obtain Voronoi regions based at least in part on a Voronoi Tessellation algorithm performed on the entire region of the sample with respect to the respective particles, and obtain a set of pairs of the nearest neighboring particles based on a Delaunay triangulation algorithm performed on the Voronoi regions.

In the above system, the first operator is configured to calculate energy values of the pairs of neighboring particles based at least in part on the Lennard-Jones potential equation $V_{mod}(r)$:

$$V_{mod}(r) = \begin{pmatrix} V_{mod}(R^*), & r < R^* \\ V_{mod}(r), & r \geq R^* \end{pmatrix}$$

where r denotes a distance between the neighboring particles, and $R^*$ denotes a preset threshold value for preventing divergence of the energy values of the neighboring particle pairs. In the above system, the first operator is configured to obtain the sum of the energy values of neighboring particle pairs as a static degree of randomness value of particles. In the above system, the threshold value is a mean radius value of particles.

In the above system, the threshold value is preset to be in a range of about $$\frac{\sigma}{8} \text{ to about } \frac{\sigma}{2},$$

and wherein σ denotes the equilibrium distance between particles. In the above system, the first operator is configured to determine the equilibrium distance between particles based at least in part on the following equation:

$$\sigma = \sqrt{\frac{I_{WL} \times I_{HL}}{P_N^2}}$$

where $I_{WL}$ denotes the width of the sample image, $I_{HL}$ denotes the height of the sample image, and $P_N^2$ denotes the number of particles in the sample image.

In the above system, the second operator is configured to define a tensile force ($f^T$) between particles based at least in part on the following tensile force equations:

$$f^T = k_T(\|x_{ij}\| - l_0)\frac{x_{ij}}{\|x_{ij}\|},$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2},$$

$$\frac{\partial f^T}{\partial v_j} = 0,$$

and wherein the second operator is further configured to calculate the sum of tensile forces by applying the tensile force equations to the following governing equation of implicit integration:

$$\left(M - h\frac{\partial f}{\partial v} - h^2\frac{\partial f}{\partial x}\right)\Delta v = h\left(f_0 + h\frac{\partial f}{\partial x}v_0\right)$$

where M denotes a diagonal matrix of (3n×3n) having masses of particles as elements, f denotes a (33n×1) vector having forces of particles as elements, v denotes a (3n×1) vector having speeds of particles as elements, x denotes a (3n×1) vector having positions of particles as elements, $l_0$ denotes a equilibrium distance, $k_T$ denotes a spring constant, and h denotes a time step.

Another aspect is a method of image analysis comprising: receiving an image of a sample; isolating particles from a background image of the sample image; detecting positions of the isolated particles; calculating a static degree of randomness values of particles using Lennard-Jones potentials based on the detected positions of the particles; obtaining a dynamic degree of randomness values of particles based on the sum of tensile forces between particles by implicit integration added until the particles reach dynamic equilibrium; and calculating a positional degree of randomness of particles based on subtraction of the dynamic degree of randomness values from the static degree of randomness values.

In the above method, before the receiving, further comprising acquiring the sample image via one of a scanning electron microscope (SEM), an atomic force microscope (AFM) and an optical microscope. In the above method, between the detecting and the calculating of the static degree, further comprising: obtaining Voronoi regions with the use of a Voronoi Tessellation algorithm performed on the entire region of the sample for the respective particles; and obtaining a set of pairs of the nearest neighboring particles based on a Delaunay triangulation algorithm performed on the Voronoi regions.

In the above method, the calculating of the static degree comprises calculating energy values of the pairs of neighboring particles based at least in part on the Lennard-Jones potential equation $V_{mod}$ (r):

$$V_{mod}(r) = \begin{pmatrix} V_{mod}(R^*), & r < R^* \\ V_{mod}(r), & r \geq R^* \end{pmatrix}$$

where r denotes a distance between the neighbor particles, and R* denotes a preset threshold value for preventing divergence of the energy values of the neighbor particle pairs.

In the above method, the calculating of the static degree comprises obtaining the sum of the energy values of neighboring particle pairs as a static degree of randomness value of particles. In the above method, the threshold value is a mean radius value of particles.

In the above method, the threshold value is preset to be in a range of about $$\frac{\sigma}{8} \text{ to about } \frac{\sigma}{2},$$

and wherein σ denotes an equilibrium distance between particles.

In the above method, the equilibrium distance between particles is determined based at least in part on the following equation:

$$\sigma = \sqrt{\frac{I_{WL} \times I_{HL}}{P_N^2}}$$

where $I_{WL}$ denotes the width of the sample image, $I_{HL}$ denotes the height of the sample image and $P_N^2$ denotes the number of particles in the sample image.

In the above method, the obtaining of the dynamic degree comprises defining a tensile force ($f^T$) between particles based at least in part on the following tensile force equations:

$$f^T = k_T(\|x_{ij}\| - l_0)\frac{x_{ij}}{\|x_{ij}\|},$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2}, \frac{\partial f^T}{\partial v_j} = 0,$$

and calculating the sum of tensile forces by applying the tensile force equations to the following equation of implicit integration:

$$\left(M - h\frac{\partial f}{\partial v} - h^2\frac{\partial f}{\partial x}\right)\Delta v = h\left(f_0 + h\frac{\partial f}{\partial x}v_0\right)$$

where M denotes a diagonal matrix of 3n×3n having masses of particles as elements, f denotes a 3n×1 vector having forces of particles as elements, v denotes a 3n×1 vector having speeds of particles as elements, x denotes a 3n×1 vector having positions of particles as elements, $l_0$ denotes a equilibrium distance, $k_T$ denotes a spring constant, and h denotes a time step.

Another aspect is one or more processor-readable storage devices having processor-readable code embodied on the processor-readable storage devices, the processor-readable code for programming one or more processors to perform a method of image analysis, wherein the method comprises: receiving an image of a sample; isolating particles from a background image of the sample image; detecting positions of the isolated particles; calculating a static degree of randomness values of particles using Lennard-Jones potentials based on the detected positions of the particles; obtaining a dynamic degree of randomness values of particles based on the sum of tensile forces between particles by implicit integration added until the particles reach dynamic equilibrium; and calculating a positional degree of randomness of particles based on subtraction of the dynamic degree of randomness values from the static degree of random

DETAILED DESCRIPTION

There are two methods for measuring a positional degree of randomness. A first method is contact type measurement in which a stylus is linearly brought into contact with a surface of a sample. A second method is statistical measurement in which the extent of degree of randomness is calculated from an optical image of a sample using statistical processing.

The first method is widely used in industrial fields because it appears to be related to the degree of randomness observed by the naked eye and measurement is simply performed. According to this measurement method, the roughness of a sample surface can be measured using a stylus, similar to the operation of an atomic force microscope (AFM). Unlike an AFM in which sample regions are scanned in all directions, however, sample regions are scanned in only one direction. Thus, values measured with a stylus may not be statistically representative over the entire sample regions. In addition, since this method is materially destructive, it is economically disadvantageous to be applied to a high-cost product or sample. Further, although this method is slightly related to the positional degree of randomness of particles, one-time measurement may be error prone. Thus, according to this method, repeated measurements are required. To reduce errors in measuring randomly distributed particles, it is necessary to perform measurements in as many directions as possible. This may require a considerable time for measurement. Damage caused to samples may further generate significant errors.

An example of the second method includes dividing the entire region of a sample into multiple rectangles and obtaining a mean value and a standard deviation from the number of particles in each rectangle. Another example of the second method includes distributing many reference points over the entire region of a sample in order to calculate a positional degree of randomness of paint particles to then measure the number of particles positioned within a constant distance from each reference point. When the number of rectangles used in dividing the particle region and the number of all particles are sufficiently large, the two methods are statistically meaningful. However, when the number of rectangles used in dividing the particle region and the number of all particles are small, there may be a large number of measurement errors. In many cases, these statistical methods may not work well with images generated by adjusting the degree of randomness of particles. In addition, the mean and standard deviation for a given sample group are calculated according to the size of rectangle and the number of reference points. However, these methods cannot provide an intuitive understanding about which of the mean or the standard deviation better represents the degree of randomness.

Hereinafter, embodiments will be described in detail with reference to the accompanying drawings.

Figure 1:
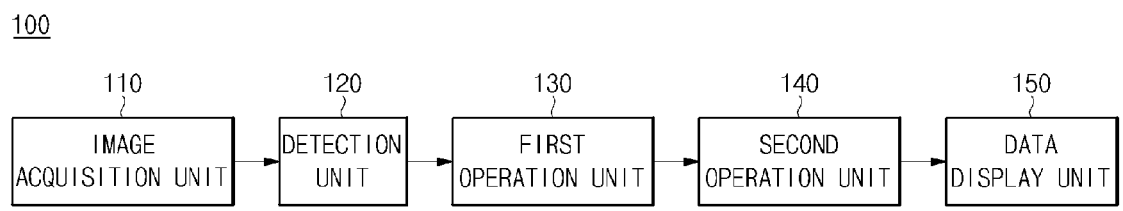
FIG. 1 is a schematic block diagram of a system for image analysis according to an embodiment.

FIG. 1 is a schematic block diagram of a system for image analysis according to an embodiment.

Referring to FIG. 1, the image analysis system 100 includes an image acquisition unit 110, a detection unit (or detector) 120, a first operation unit (or first operator) 130, a second operation unit (or second operator) 130, and a data display unit (or a data display) 150. Here, the detection unit 120, the first operation unit 130 and the second operation unit 130 may be implemented by one or more processors and memories. Algorithms disclosed below may be coded in software executed by the processors and the codes may be stored in computer readable memory.

In various embodiments, the processor may be configured as, for example, i) an advanced RISC machine (ARM) microcontroller and ii) Intel Corporation's microprocessors (e.g., the Pentium family microprocessors).

In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/Vista/2000/9x/ME/XP, Macintosh OS, OS/2, Android, iOS and the like.

The image acquisition unit 110 may acquire an image of a sample through optical measurement in order to minimize damages to the sample. For example, the image acquisition unit no may be a scanning electron microscope (SEM), an atomic force microscope (AFM) or an optical microscope, which can acquire the sample image by taking a digital photograph of the sample image.

The detection unit 120 receives the sample image from the image acquisition unit 110, isolates particles from a background image of the sample image and detects positions of the isolated particles.

The detection unit 120 may receive an original image of the sample, emphasize gray level contrast of the sample image using, for example, histogram equalization and convert the image into a black-and-white binary image using, for example, thresholding.

The detection unit 120 may eliminate point noises from the binary-converted image using, for example, dilation/erosion, simplify the contour of the image using, for example, a skeletonization algorithm, and then detect positions of the respective particles in a closed loop using, for example, a watershed algorithm.

The detection unit 120 may obtain Voronoi regions by performing a Voronoi Tessellation algorithm on the entire region of the sample based on the respective particles. Here, the Voronoi Tessellation algorithm is used to search for pairs of neighboring particles that influence each other.

After obtaining the Voronoi regions, the detection unit 120 may obtain a set of pairs of the nearest neighboring particles by performing Delaunay triangulation on the Voronoi regions. In this case, calculation of cohesion and dispersion forces applied to distantly spaced particles may be omitted. If forces applied to all particles are calculated without performing Delaunay triangulation, a computational amount may become immense. In addition, when an actual electromagnetic field is observed, second and third charged particles opposed to each other with respect to centrally positioned first charged particles may not or little be influenced by each other. Like the detection unit 120, for the purpose of efficient computation, one embodiment mathematically detects only interacting regions as Voronoi regions to then perform computation on only pairs of particles sharing the detected regions. In addition, when combinations of all cases are discovered, the computational amount becomes $N*(N-1)/2$, that is, $O(N^2)$. However, when a triangular mesh is constructed, the computational amount based on Euler's equation becomes $v-e+f=2$. Since $v=N$ and f equals to $2*N$ in a substantially triangular mesh, $e \approx 3*N-2$. Thus, the number of cases is equal to $O(N)$. Here, O denotes big-O notation indicating the number of maximum cases in the computational geometry, v, e and f denote numbers of slices, segments and surfaces, respectively.

Before describing a configuration of the first operation unit 130, basic concepts of operating algorithms of the first operation unit 130 will now be described.

Assumptions are made that sample particles have a virtual inter-particle potential and a Lennard-Jones force acts between the particles. Based on the Lennard-Jones potential, it is understood that there are two molecules in a constant equilibrium state due to cohesion and dispersion forces acting between the two molecules. According to the Lennard-Jones potential theory applied to particles, a repulsive force will act on particles concentrated at a given position and a cohesion force will act on particles distantly dispersed from each other. The cohesion and dispersion forces generated may be added up, thereby computing a positional degree of randomness value of particles in a static state.

The positional degree of randomness of particles is defined as a global degree of randomness and a local degree of randomness. The global degree of randomness indicates the extent in which particle groups in the entire image region are separated from each other. The local degree of randomness indicates the extent in which particles in each group are separated from each other.

In a given group, not only particles but also local groups of particles are formed. Therefore, lower level regions may further be defined as a global degree of randomness and a local degree of randomness. The statistical computational method described above is inefficient because the positional degree of randomness of particles is defined simply by the number of particles without a consideration given to effects of relative arrangement of particles in various hierarchies. Thus, the statistical computational method is impractical because there are an infinite number of cases in calculating the global degree of randomness and the local degree of randomness of particles in various hierarchies by tracking down formation of groups one by one.

Assuming that particles have a virtual inter-particle potential, it is understood that the sum of potentials due to cohesion and dispersion forces among molecules is related to the degree of randomness of particles. That is to say, based on the Lennard-Jones potentials, when two molecules are positioned more closely to each other than an equilibrium distance, a dispersion force may act between the two molecules. Conversely, when two molecules are positioned more distantly from each other than the equilibrium distance, a cohesion force may act between the two molecules. Therefore, a Lennard-Jones potential value may be used as the same concept as the standard deviation indicating how far particles are deviated from a given distance (corresponding to an equilibrium distance between two molecules in the Lennard-Jones potential). Therefore, the sum of Lennard-Jones potentials indicates how far multiple particle pairs are deviated from the equilibrium distance.

The configuration of the first operation unit 130 will now be described. The first operation unit 130 may calculate a static degree of randomness values of the particles using Lennard-Jones potentials based on the positions of the particles detected by the detection unit 120. The general Lennard-Jones potential $V_{LJ}(r)$ can be represented by the following equation:

$$V_{LJ}(r) = 4\varepsilon_0 \left[ \left(\frac{\sigma}{r}\right)^{12} - \left(\frac{\sigma}{r}\right)^{6} \right] \quad (1)$$

where $\epsilon_0$ denotes a potential value of a potential well, $\sigma$ denotes the equilibrium distance between two adjacent molecules, which can be given as a constant and r denotes a distance between two adjacent molecules.

The Lennard-Jones potential $V_{LJ}(r)$ equation has two terms: a repulsive term describing Pauli repulsion regions represented by $$\left(\frac{\sigma}{r}\right)^{12},$$

which imparts a force for scattering particles; and a cohesive term describing van der Waals force regions represented by $$\left(\frac{\sigma}{r}\right)^{6},$$

which imparts a force for condensing particles to converge the condensed particles into one location. As described above, the Lennard-Jones potentials $V_{LJ}(r)$ indicate the differences between dispersion and cohesion forces which are applied between neighboring particle pairs, and the sum of Lennard- Jones potential values corresponds to a static degree of randomness indicating how far distances of multiple particle pairs are deviated from the equilibrium distance.

However, the general Lennard-Jones potential $V_{LJ}(r)$ has the following problems. When two particles are very close to each other, for example, when two particles are positioned to converge into 0 (zero), the Lennard-Jones potential value $V_{LJ}(r)$ approaches infinite. Therefore, if even a single particle pair exists, the sum of degrees of randomness values may become infinite, resulting in an excessively larger degree of randomness value than expected. That is to say, when an inter-particle distance r in Equation (1) approximates to 0, the Lennard-Jones potential value $V_{LJ}(r)$ approaches infinite. Positions of particles detected by the detection unit 120 have integer values according to image resolutions. Thus, if an identical particle is detected twice or overlapping particles are detected, which is not often the case, though, the Lennard-Jones potential value $V_{LJ}(r)$ may become infinite.

Thus, the first operation unit 130 may calculate energy values of pairs of the nearest neighboring particles based on the following modified Lennard-Jones potential $V_{mod}(r)$ having a finite potential value and preventing divergence of the energy values of the neighbor particle pairs:

$$V_{mod}(r) = \begin{pmatrix} V_{mod}(R^*), r < R^* \\ V_{mod}(r), r \geq R^* \end{pmatrix} \quad (2)$$

where $V_{mod}(r)$ indicates the energy of neighboring particle pairs, r denotes the distance between the neighboring particles, and R* denotes a preset threshold value determined such that the energy $V_{mod}(r)$ of neighboring particle pairs has a finite value when r equals to or approximates to 0.

As expressed in Equation (2), the first operation unit 130 may apply the inter-particle distance r to the Lennard-Jones potential equation $V_{LJ}(r)$ when the inter-particle distance value r is greater than or substantially equal to the threshold value R*, and may apply the threshold value R* to the Lennard-Jones potential equation $V_{LJ}(r)$ when the inter-particle distance value r is smaller than the threshold value R*, thereby making the Lennard-Jones potential value $V_{mod}(r)$ have a finite value. That is to say, an upper limit value is set to the Lennard-Jones potential value.

Any value greater than 0 and smaller than or substantially equal to the equilibrium distance ($\sigma$) may be set to the threshold value R*. As the inter-particle distance value r approximates to 0, the Lennard-Jones potential value $V_{mod}(r)$ may become divergent. Thus, even if the inter-particle distance value r is o, the threshold value R* is set to any value as long as it makes the $V_{mod}(r)$ value become a finite value.

For example, the threshold value R* may be set to a mean radius value of particles. In an embodiment, since particle samples have the same particle shape (for example, a spherical shape) and substantially the same particle size distribution, it is assumed that the threshold value R* is substantially the same for all over the entire image.

In addition, the threshold value R* may be preset to be within a range of about $$\frac{\sigma}{8} \text{ to about } \frac{\sigma}{2}.$$

Furthermore, the threshold value R* may be any value that can prevent the Lennard-Jones potential value $V_{mod}(r)$ from diverging to an infinite value.

For example, in a state in which R* is set to about $$\frac{\sigma}{8},$$

if r is smaller than about $$\frac{\sigma}{8}, V_{mod}(r) = 4^*V(\sigma).$$

In a state in which R* is set to about $$\frac{\sigma}{4},$$

if r is smaller than about $$\frac{\sigma}{4}, V_{mod}(r) = 16^*V(\sigma).$$

In a state in which R* is set to about $$\frac{\sigma}{2},$$

if r is smaller than about $$\frac{\sigma}{2}, V_{mod}(r) = 64^*V(\sigma).$$

Therefore, the smaller the R* value, the greater the virtual repulsion effect due to intermolecular cohesion. Conversely, the smaller the R* value, the smaller the cohesive effect. In a case where r* is set to about $$\frac{\sigma}{2},$$

the repulsive and cohesive effects are demonstrated best. However, in a case where the threshold value R* is set to deviate from the range stated above, that is, about $$\frac{\sigma}{8} < R^* < \text{about } \frac{\sigma}{2},$$

since some samples shows a small difference in degrees of randomness values, it is not efficient to distinguish one sample from another. Accordingly, the threshold value R* is set be within the range stated above.

The first operation unit 130 may add up all of the calculated Lennard-Jones potential values $V_{mod}(r)$. Accordingly, the first operation unit 130 may obtain a static degree of randomness values. That is to say, as described above, the sum of the Lennard-Jones potential values $V_{mod}(r)$ is substantially equal to a static degree of randomness value of particles.

Meanwhile, if the equilibrium distance ($\sigma$) value is fixed in the Lennard-Jones potential value $V_{mod}(r)$, a consideration may not be taken into a size effect of the entire image region. Therefore, in one embodiment, the inter-particle equilibrium distance (σ) is determined based on the following equation:

$$\sigma = \sqrt{\frac{I_{WL} \times I_{HL}}{P_N^2}} \quad (3)$$

where $I_{WL}$ denotes a width length of a sample image, $I_{HL}$ denotes a height length of a sample image, and $P_{N^2}$ denotes the number of particles in the sample image.

In addition, as described above, the equation of the Lennard-Jones potential value $V_{mod}(r)$ consists of Pauli repulsion regions, which can be expressed by $$\left(\frac{\sigma}{r}\right)^{12}$$

to impart a dispersion force to particles, and van der Waals force regions, which can be expressed by $$\left(\frac{\sigma}{r}\right)^{6}$$

to impart a cohesion force to particles. Based on the Lennard-Jones potentials defined as the equation (2), the dispersion force becomes $V_{mod}(r)$ when $r<R_0$, and the cohesion force becomes $V_{mod}(r)$ when $r \geq R_0$. Here, $R_0$ denotes the distance between two particles when the Lennard-Jones potential becomes a minimum value. Thus, when $r<R_0$, the dispersion force is applied to the regions, and when $r \geq R_0$, the cohesion force is applied to the regions. As described above, according to one embodiment, the dispersion force and the cohesion force of particles are separately calculated using modified Lennard-Jones potentials, thereby logically analyzing a change in the dispersion state according to molecular states of particles. In addition, in one embodiment, more accurate dispersity can be calculated than in the statistical analyses, as proposed by Liu or Diebold.

Therefore, since the first operation unit 130 calculates the static positional degree of randomness value using the modified Lennard-Jones potentials, merged effects of a global degree of randomness and a local degree of randomness in various hierarchies are not necessarily considered, which is advantageous.

Before describing a configuration of the second operation unit 140, basic concepts of operating algorithms of the second operation unit 140 will now be described.

Since the degree of randomness of particles is conceptually a kind of entropy, it is difficult to indicate a slight degree of randomness difference simply by dealing particles existing in a static state without dealing with the dynamic entropy. Since the concept of entropy can represent the difference between degrees of randomness values of particles being dynamically in two states and cannot be represented in a single state, one embodiment considers a positional degree of randomness of particles as a relative difference value with respect to a reference state. In this embodiment, a hexagonal-packing state is proposed as a reference state of a particle degree of randomness. That is to say, while it is assumed in the algorithm of the first operation unit 130 that particles are molecules existing in a static state, it is assumed in the algorithm of the second operation unit 140 that particles are virtual gas particles existing in a dynamic state. The particles reach a static equilibrium state after a lapse of a predetermined time. Here, since radii, attraction and repulsion of the particles are given as constant values, the particles may presumably reach a state that is similar to the hexagonal-packing state having triangular arrangements.

A configuration of the second operation unit 140 will now be described.

In order to stably simulate a dynamic equilibrium state of particles (to be referred to as a dynamic relaxation process), the second operation unit 140 may employ a semi-implicit integration method, which is introduced by Baraff and is commercially used for cloth simulation. An integration method such as Explicit Euler integration is simple to implement, however, when it is actually employed, considerable numerical divergence may occur. Thus, if the number of particles is large, the particles cannot normally reach a dynamic equilibrium state.

The basic governing equation of semi-implicit integration can be expressed as follows:

$$\left(M - h\frac{\partial f}{\partial v} - h^2 \frac{\partial f}{\partial x}\right)\Delta v = h\left(f_0 + h\frac{\partial f}{\partial x}v_0\right) \quad (4)$$

where M denotes a diagonal matrix of (3n×3n) having elements $m_0, m_0, m_0, m_1, m_1, m_1, \ldots m_{n-1}, m_{n-1}, m_{n-1}$. Here, m denotes the mass of a particle, and n denotes the number of particles or beads. In addition, in Equation (4), f denotes a (3n×1) vector having forces of particles as elements, v denotes a (3n×1) vector having speeds of particles as elements, x denotes a (3n×1) vector having positions of particles as elements, and h denotes a time step. In one embodiment, the time step h denotes stepwise durations of time required until a dynamic equilibrium is reached and is arbitrary defined. An operation may be performed at every time step.

The second operation unit 140 may define an inter-particle tensile force ($f^T$) using the following equations:

$$f^T = k_T(\|x_{ij}\| - l_0)\frac{x_{ij}}{\|x_{ij}\|} \quad (5)$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2}, \quad (6)$$

$$\frac{\partial f^T}{\partial v_j} = 0$$

where kr denotes a spring constant, $l_0$ denotes an equilibrium distance, and $I_{33}$ denotes a diagonal matrix of (3n×3n) having masses of particles as elements. Here, the equilibrium distance $l_0$ may be set to a threshold value R* for preventing numerical divergence of the Lennard-Jones potential.

The equations (5) and (6) are simplest models of equations representing an inter-particle tensile force ($f^T$.). Since more complex equations than the equations 5 and 6 make no difference in the calculation result, one embodiment adopts the inter-particle tensile force ($f^T$) defined by the simplest equations (5) and (6). Since a bending force or a shearing force in addition to the inter-particle tensile force ($f^T$) are not required in computing the degree of randomness, computation steps associated with the bending force or the shearing force may be omitted.

The second operation unit 140 calculates an inter-particle tensile force ($f^T$) defined by the equations (5) and (6) for each of the particles and the calculation results are applied to the governing equation of the equation (4). If these procedures are progressed, the governing equation of the equation (4) becomes a linear equation. Thereafter, the second operation unit 140 may perform a matrix operation using a recursive technique such as a conjugate gradient method, and a particle position of a next time step can be calculated from the result obtained from the matrix operation.

In one embodiment, the second operation unit 140 iteratively performs the above-stated procedures until there is no further change in the particle position that is, until a hexagonal-packing state of particles is reached, thereby ultimately obtaining the sum of inter-particle tensile forces. Here, the second operation unit 140 may calculate and record a static degree of randomness values at every time step by performing the above-stated procedures, and may sum up the static degree of randomness values calculated at every time step, thereby obtaining a dynamic degree of randomness value. That is to say, as described above, the sum of inter-particle tensile forces added until a dynamic equilibrium is reached becomes the dynamic degree of randomness value.

The second operation unit 140 calculates a positional degree of randomness of particles by subtracting the dynamic degree of randomness value from the static degree of randomness value calculated by the first operation unit 130. As described above, since the degree of randomness of particles is conceptually a kind of entropy, which can be represented by the difference between degrees of randomness values of particles being dynamically in two states. Therefore, the second operation unit 140 calculates the difference between i) the static degree of randomness value of particles in original states and ii) the dynamic degree of randomness value until a hexagonal-packing state of particles is reached, that is, until a final equilibrium state is reached, as a positional degree of randomness values of particles, thereby more accurately measuring the positional degree of randomness of particles.

The data display unit 150 may display calculation results of the first operation unit 130 and the second operation unit 140 to allow a user to grasp the results intuitively. For example, the data display unit 125 may display various forms of graphical representation of numerical data of the calculation results of the first operation unit 130 and the second operation unit 140.

Hereinafter, an experimental example according to an embodiment will be described.

1. Preparation of Sample

In the experimental example according to an embodiment, it was assumed that particles have the same size and shape. An anti-glare (AG) film for a liquid crystal display was used as the sample. The AG film is used for the purpose of enhancing visibility by converting diffuse reflection of light into diffuse reflection due to collision of silica particles.

The AG film is prepared as follows. First, colloidal silica particles dispersed in isopropyl alcohol, the particles having a mean radium of about 10 nm to about 20 nm, a UV curable resin and 1,8-azabicyclo[5,4 ,0]undeca-7-ene were mixed to prepare a hard coating material. Then, the hard coating material was coated on a polyethylene terephthalate (PET) film having a thickness of about 125 μm, followed by curing at about 80° C. for one minute and irradiating UV light, thereby preparing silica-dispersed AG film having a mean particle size of about 3 μm.

The prepared film includes four samples of a reference sample and three comparative samples. Since the effect of dispersion cannot be discriminated by naked eye, a haze level representing light transmittance of a film was measured by a standard method of ASTM D1003-95, static dispersion values according to a comparative example, and dynamic dispersion values according one embodiment were measured, and the measurement results were compared. However, the haze is not directly related with dispersion. Since there is no objective, reliable measurement method to quantify a dispersion state, haze measurement is widely employed. Haze levels were measured three times and a mean value of three measured haze levels was used.

Table 1 shows measurement results of haze levels of the AG film.

TABLE 1

| ID | Haze (internal) | Gloss (60°/45°/20°) | Roughness | | |
|---|---|---|---|---|---|
| | | | Ra | Rz | Sm |
| L1 | 8.6 | 44/88/90 | 0.0864 | 0.8506 | 29.4 |
| F1 | 6.6 | 47/95/93 | 0.0712 | 0.7775 | 26.6 |
| F2 | 6.4 | 59/105/96 | 0.0475 | 0.5645 | 23.1 |
| F3 | 7.2 | 44/92/93 | 0.0662 | 0.6672 | 23.0 |

2. Comparison with Visual Assessment Results

First, it is important to clarify the concepts of a global positional degree of randomness and a local positional degree of randomness. Basically, actual particles in a natural state are not perfectly evenly dispersed but tend to agglomerate to a certain extent. In order to evaluate the positional degree of randomness of particles, not only information concerning inter-particle distribution but also relative sizes of agglomerated particle groups in the entire space occupied by the particle groups are taken into consideration. In this embodiment, the former is defined as a local degree of randomness and the latter is defined as a global degree of randomness. In one embodiment, in a case of a polymer composite material, for example, particle groups of a reinforcement member for reinforcing the polymer composite material are substantially uniformly distributed and dispersed, which is referred to as a global degree of randomness, and particles are substantially uniformly distributed within each of the particle groups, which is referred to as a local degree of randomness. In one embodiment, in order to properly represent the degree of randomness of particles, the degree of randomness is expressed at two concept levels. For example, the global degree of randomness and the local degree of randomness can be expressed by Lennard-Jones potentials based on dispersion and cohesion forces.

Figure 2A:
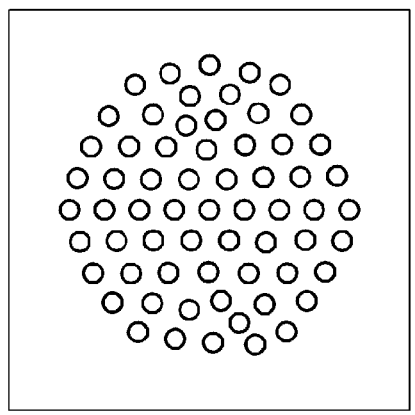
FIGS. 2A to 2C are graphs illustrating various images of particles according to experimental examples of one embodiment and static dispersive and cohesive effects of particles.
Figure 2A:
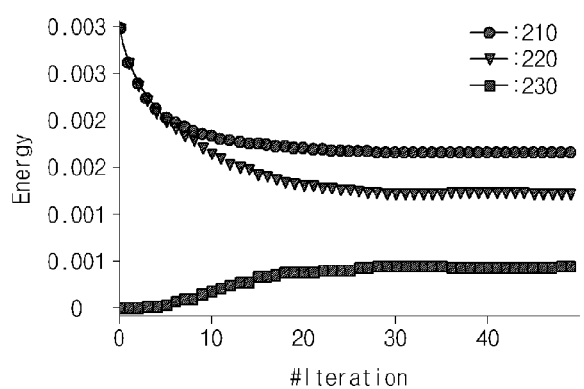
Figure 2B:
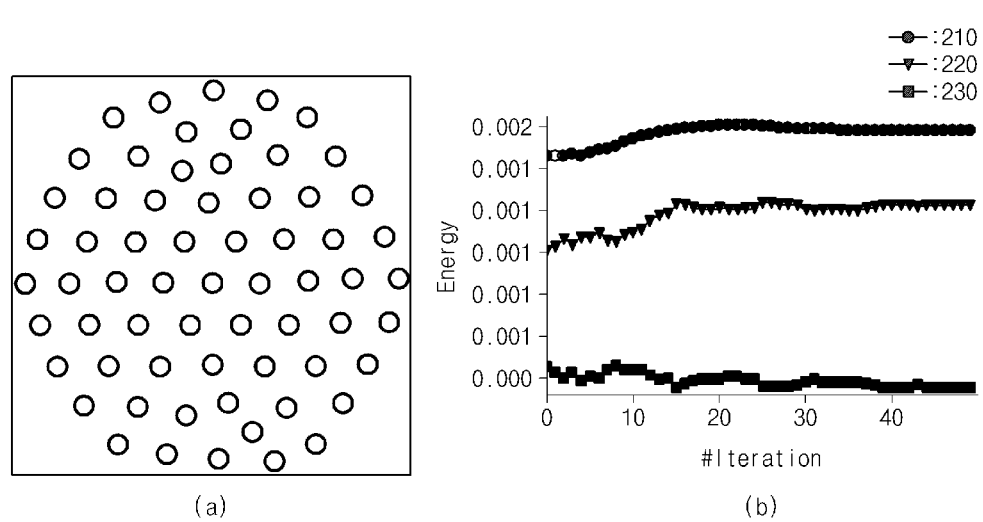
Figure 2C:
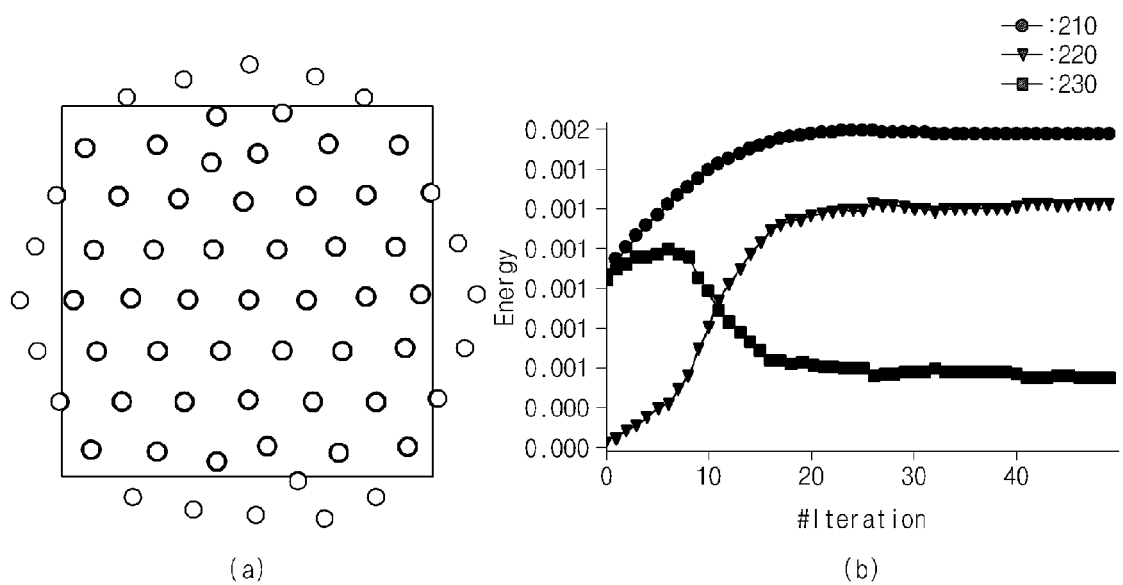

FIGS. 2A to 2C are graphs illustrating various images of particles according to experimental examples of one embodiment and effects of static dispersion force and a cohesion force applied to particles (to be referred to as 'scenario I' hereinafter). In FIGS. 2A to 2C, reference numeral 210 denotes a static dispersion value at each time step, reference numeral 220 denotes a static repulsion value at each time step, and reference numeral 230 denotes a cohesion value at each time step.

In (a) images of FIGS. 2A to 2C, an equal number of particles are spatially arranged relative to neighboring particles, but sizes of regions occupied by particles with respect to the entire matrix area are different. However, the statistical methods introduced by Liu and Diebold could not satisfactorily provide information on the differences in the particle regions in a case where there are a small number of particles.

In (b) images of FIGS. 2A and 2B, effects of static dispersion, repulsion and cohesion forces applied to particles during dynamic relaxation simulation are graphically illustrated. The sum of two types of energy, that is, the dispersion and cohesion forces, is defined as a static dispersity index at each time step, which is consequently substantially equal to a value calculated only by the first operation unit 130. However, since the algorithm of the first operation unit 130 does not separately deal with the dispersion and cohesion forces, it is difficult to accurately identify which of the dispersion and cohesion forces causes a change in the dispersion value.

FIG. 2B shows values of particles in a hexagonal-packing state, and there are variations in some of the particle values because the particles are subjected to a slight virtual Brownian motion during dynamic relaxation simulation when no consideration is given to a damping force applied to the interparticle tensile force of Equation (5). However, since the consequent positional degree of randomness was not affected by the variations in some particle values, the damping force was ignored.

Referring to FIG. 2A illustrating that particles are agglomerated at an initial stage, according to iterations of dynamic relaxation simulation, the cohesion value 230 decreases while the dispersion value 220 increases.

On the contrary, referring to FIG. 2C illustrating that particles are overly dispersed, according to iterations of dynamic relaxation simulation, the cohesion value 230 increases while the dispersion value 220 decreases. As shown in FIGS. 2A and 2C, it is not possible to demonstrate trivial differences in the dispersion value 220 and the cohesion value 230 using the statistical computational methods proposed by Liu and Diebold.

Figure 3:
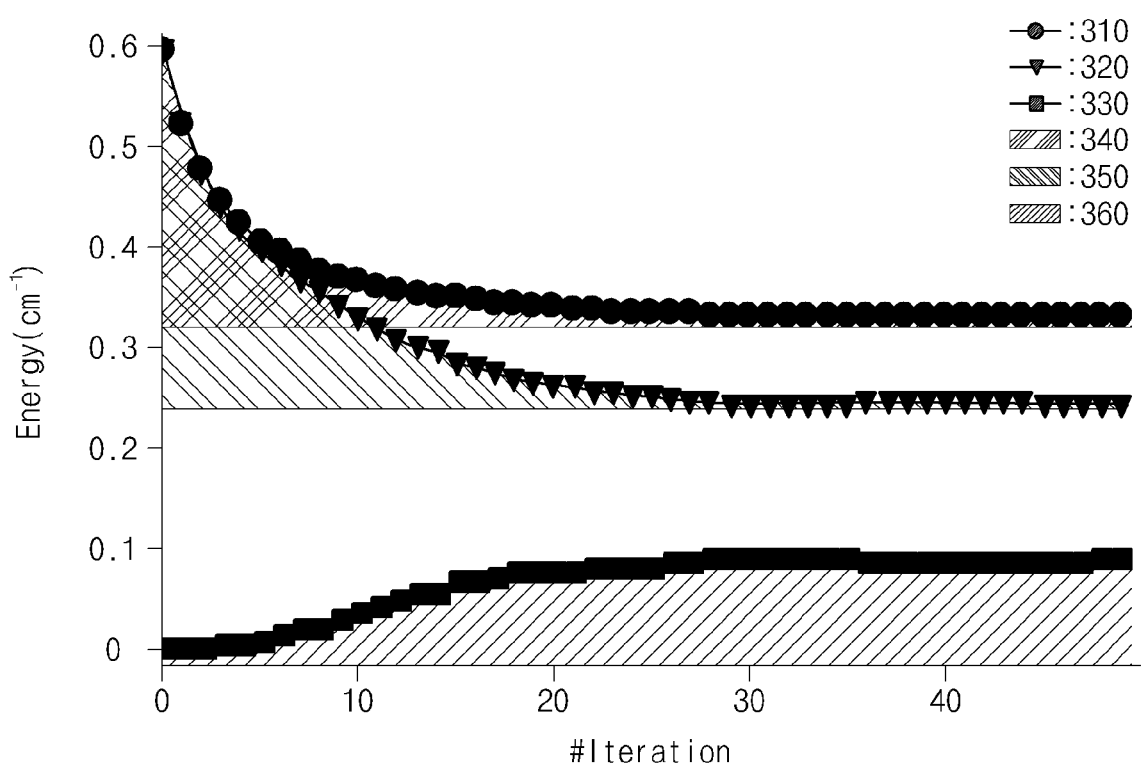
FIG. 3 is a graph illustrating an integration method during dynamic relaxation simulation according to an embodiment.

FIG. 3 is a graph illustrating an integration method during dynamic relaxation simulation according to an embodiment. In FIG. 3, reference numerals 310-330 represent static dispersity index per step, static repulsive potential per step and static contractive potential per step, respectively. In addition, reference numerals 340-360 represent sum of relative dispersity, sum of relative repulsive potential and sum of relative contractive potential, respectively.

Figure 4A:
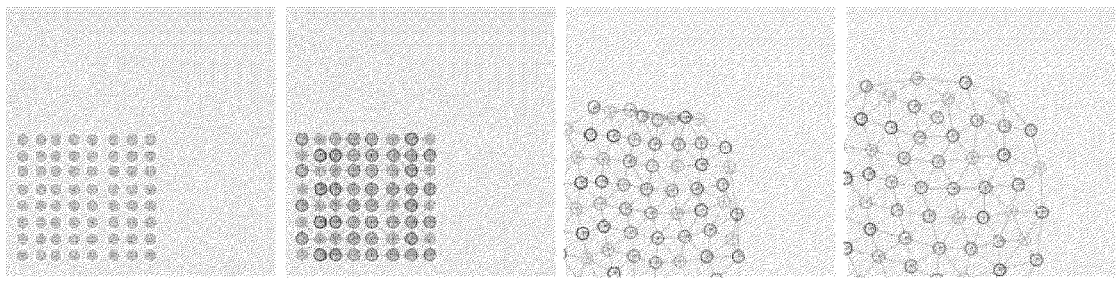
FIGS. 4A to 4J illustrate various images of virtual particle samples.
Figure 4B:
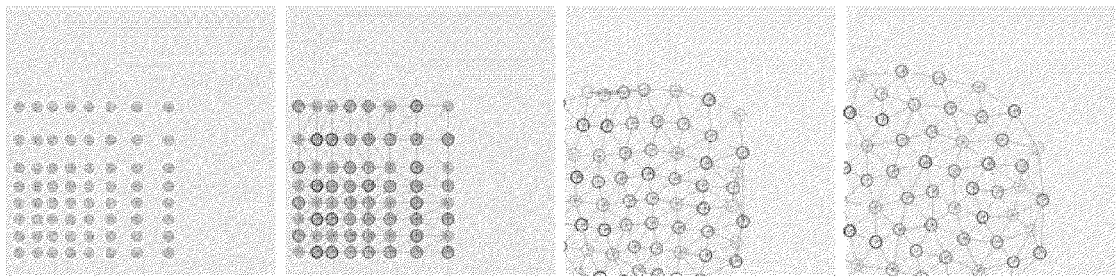
Figure 4C:
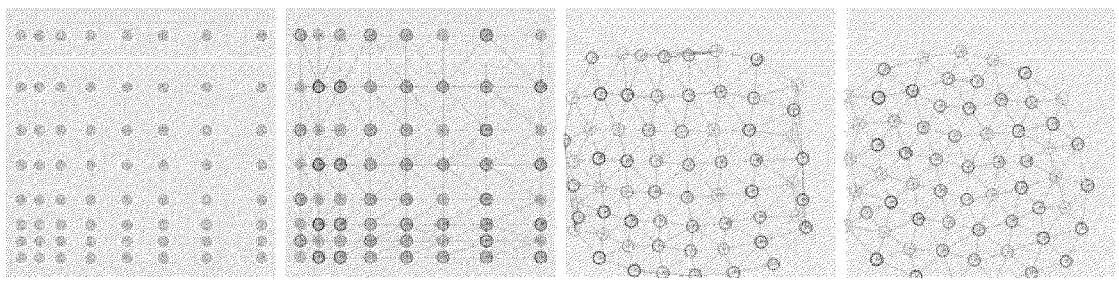
Figure 4D:
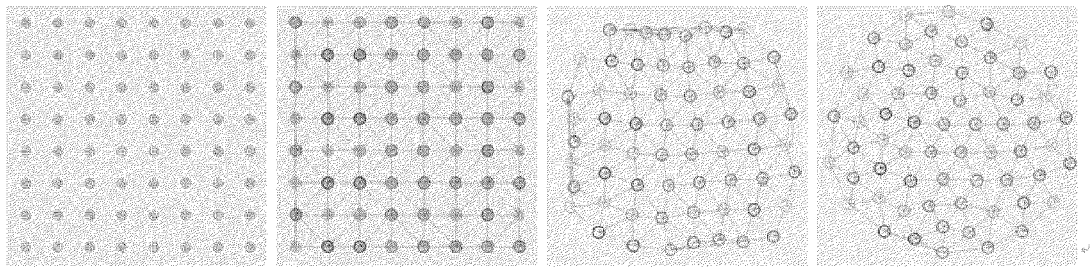
Figure 4E:
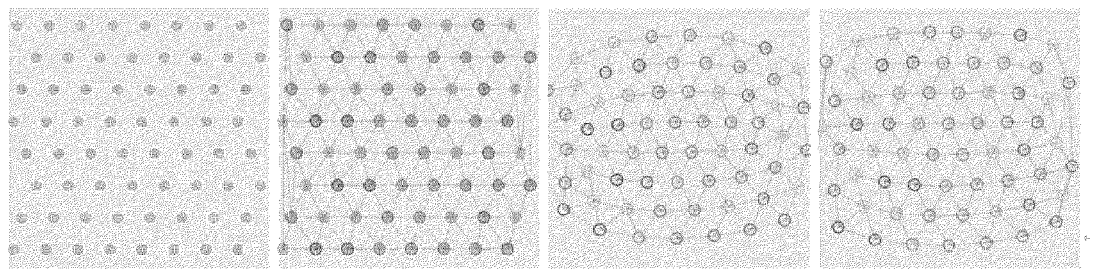
Figure 4F:
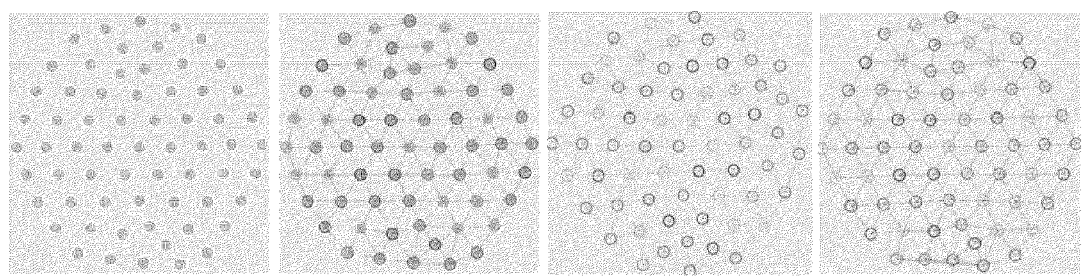
Figure 4G:
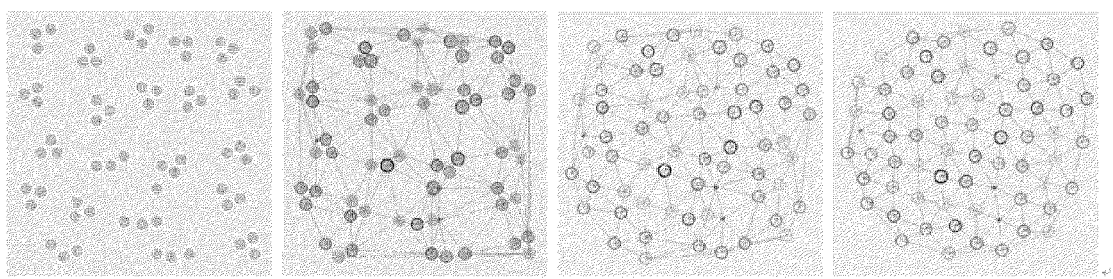
Figure 4H:
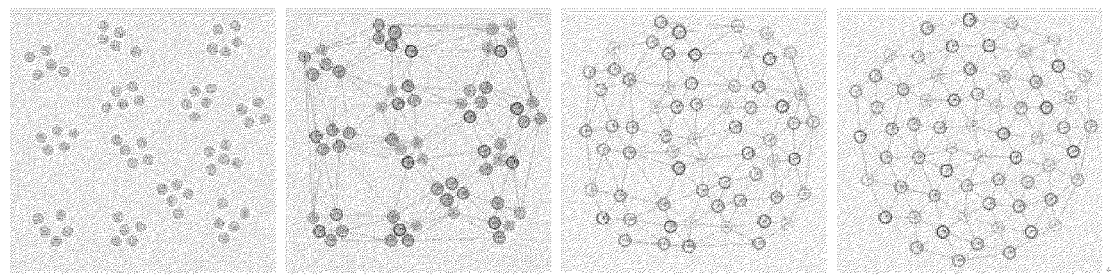
Figure 4I:
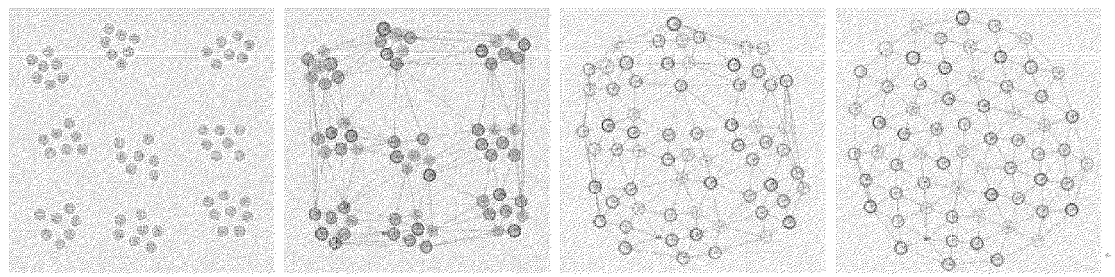
Figure 4J:
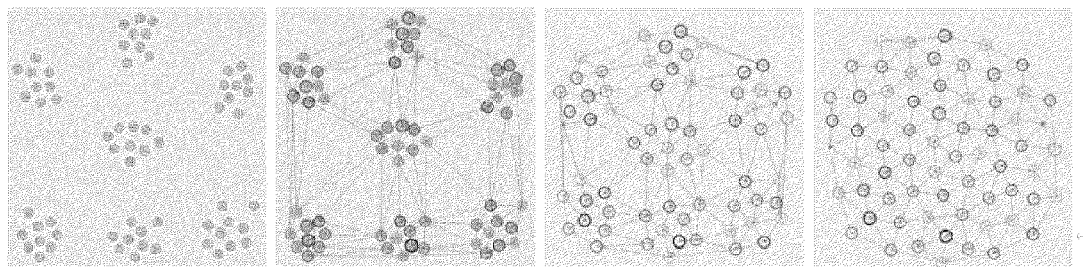

FIGS. 4A to 4J illustrate various images of virtual particle samples. Here, FIGS. 4A to 4D illustrate a scenario I, FIGS. 4E and 4F illustrate a scenario II, and FIGS. 4G to 4J illustrate a scenario III. In the scenario II, more general situations are considered than in the scenario I. In the scenario III, particle groups each including 3, 5, 7 and 9 intra-particles are formed.

Figure 5:
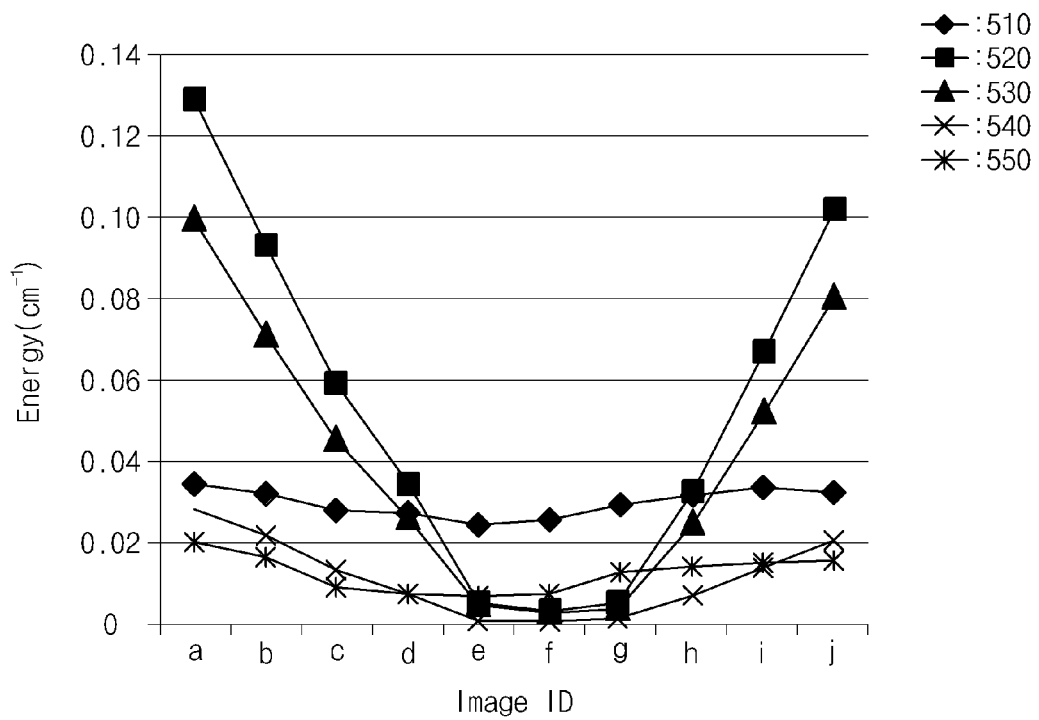
FIG. 5 is a graph illustrating measurement results of a dynamic degree of randomness of the images of various virtual particle samples shown in FIGS. 4A to 4J.

FIG. 5 is a graph illustrating measurement results of a dynamic degree of randomness of the images of various virtual particle samples shown in FIGS. 4A to 4J. In FIG. 5, reference numeral 510 denotes the sum of static dispersion values calculated without dynamic relaxation simulation, reference numeral 520 denotes the sum of static dispersion values calculated with dynamic relaxation simulation, reference numeral 530 denotes the sum of dispersion forces of particles, reference numeral 540 denotes the sum of cohesion forces of particles, and reference numeral 550 denotes a static dispersion value at an initial time step.

Expected linear results are shown in the scenario II, like in the scenario I. Although the particles in the scenario II and the scenario I are not initially at hexagonal-packing states and have different centers of gravity, the particles in the scenarios II and I demonstrate the same trend, suggesting that dynamic particle dispersion values tend to have consistent values. The scenario III corresponds to particle images for a more general case than the scenario I or the scenario II. In the scenario III, the particles images show the same trend as the visual dispersion trend even with a small number of particles.

3. Dispersion Comparison with Haze Measurement

Figure 6:
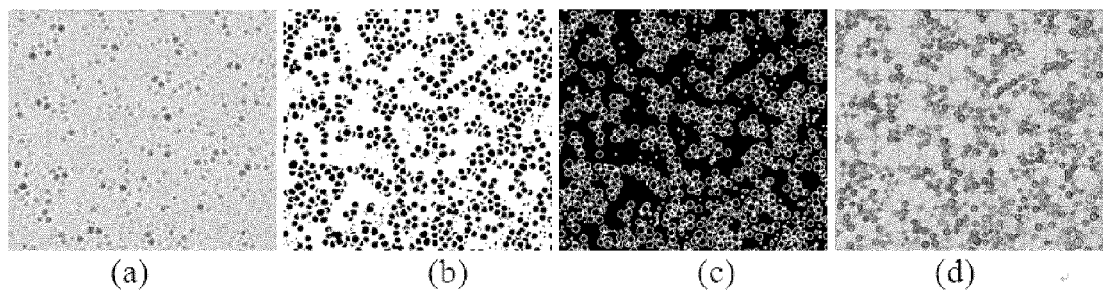
FIG. 6 illustrates comparative results of haze measurement and inventive measurement.

Finally, particle dispersion states of an actually fabricated AG film are compared. Image analysis was conducted on silica particles, as photographed by an optical microscope, to detect positions and sizes of particles. The size detection result showed that the particles have substantially the same radius. FIG. 6 illustrates comparative results of haze measurement shown in Table 1 and measurement according to one embodiment (hereinafter "inventive measurement").

Differences among four sample images (a), (b), (c) and (d) of FIG. 6 could not be discriminated from each other by a naked eye. However, the results of haze measurement or dynamic dispersion measurement show that dispersion states of reference and comparative samples are different from each other. This implies that the haze measurement can be replaced by the dynamic dispersion measurement. In addition, since light scattering properties of particles are used in a direct measurement method, such as haze measurement, the measured dispersion state is just an indirect measurement result. However, since two-dimensional positional distribution of particles is directly used in the inventive measurement, the inventive measurement is regarded as a direct method for representing a particle degree of randomness. In addition, since the result value of the inventive measurement is expressed by a single value, the inventive measurement can be advantageously used as intuitive measurement without a user's subjectivity or additional statistic processing.

Figure 7:
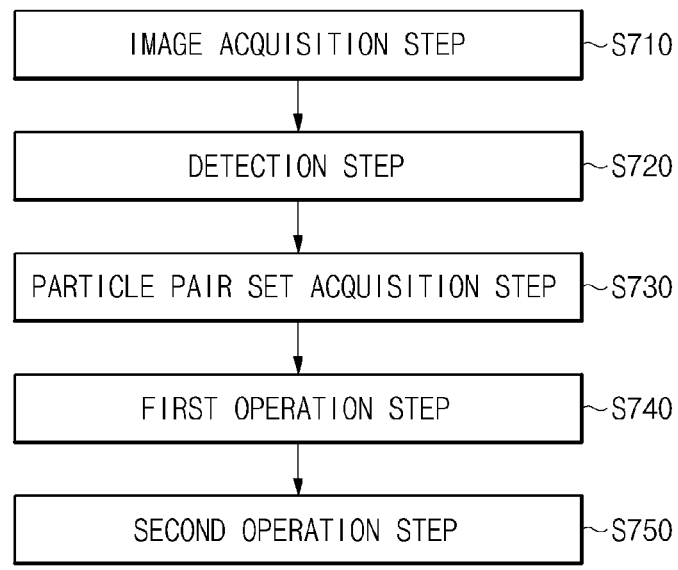
FIG. 7 is a flowchart illustrating a method of image analysis according to another embodiment.

Hereinafter, a method of image analysis according to another embodiment will be described. FIG. 7 is a flowchart illustrating a method of image analysis (S700) according to another embodiment. Depending on the embodiment, additional steps may be added, others removed, or the order of the steps changes in FIG. 7. Referring to FIG. 7, the method of image analysis (S700) includes an image acquisition step (S710), a detection step (S720), a particle pair set acquisition step (S730), a first operation step (S740), and a second operation step (S750).

The image acquisition step (S710) may be performed by the image acquisition unit 110 as described with respect to FIG. 1. The detection step (S720) and particle pair set acquisition step (S730) may be performed by the detection unit 120 as described with respect to FIG. 1. The first operation step (S740) may be performed by the first operation unit 130 as described with respect to FIG. 1. The second operation step (S750) may be performed by the second operation unit 140 as described with respect to FIG. 1. Each of the steps (S710-S740) can also be performed by one or more microprocessors programmed to perform functions of the corresponding units (110-140).

In one embodiment, the FIG. 7 procedure (or at least part of the procedure) is implemented in a conventional programming language, such as C or C++ or another suitable programming language. In one embodiment, the program is stored on a computer accessible storage medium. The storage medium may comprise any of a variety of technologies for storing information. In one embodiment, the storage medium comprises a random access memory (RAM), hard disks, floppy disks, digital video devices, compact discs, video discs, and/or other optical storage mediums, etc. In another embodiment, the procedure can be implemented with embedded software.

Irrespective of the number of particles, the image analysis method according to one embodiment can be employed for measure a dispersity index, while the statistical methods, proposed by Liu and Diebold, as basic image analysis methods, are employed only when there are an infinite number of particles.

According to at least one of the disclosed embodiments, in the system for image analysis and method thereof, a non-destructive particle degree of randomness measurement is enabled and more objective and accurate measurement results and intuitive analysis results can be obtained.

In addition, since measurement is conducted on an optical image of a sample, non-destructive particle degree of randomness measurement is enabled.

Furthermore, a set of effective particle pairs may be obtained using Voronoi Tessellation and Delaunay triangulation, and a computational amount can be reduced.

Since there is no room for intervention of a user's subjectivity, more objective and accurate measurement can be obtained.

In addition, since one embodiment, in which a positional degree of randomness value is expressed by a constant, advantageously provides for an intuitive understanding of a positional degree of randomness, compared to the statistical methods in which the evaluation result is expressed by the mean and standard deviation values. Moreover, since the above embodiment involves calculations using positional distribution of particles, the positional degree of randomness of particles can be directly represented.

Although the above embodiments have been described with reference to the accompanying drawings, it will be understood by those skilled in the art that a variety of modifications and variations may be made without departing from the spirit or scope of the appended claims, and their equivalents.

What is claimed is:

1. A system for image analysis comprising:
a detector configured to receive an image of a sample, isolate particles from a background image of the sample image and detect positions of the isolated particles;
a first operator configured to calculate a static degree of randomness values of the particles using Lennard-Jones potentials based on the detected positions; and
a second operator configured to obtain a dynamic degree of randomness values of particles based at least in part on the sum of tensile forces between particles by implicit integration added until the particles reach a dynamic equilibrium, and calculate a positional degree of randomness of particles based at least in part on subtraction of the dynamic degree of randomness values from the static degree of randomness values,
wherein the first operator is configured to calculate enemy values of a set of pairs of the nearest neighboring articles based at least in part on the Lennard-Jones potential equation $V_{mod}(r)$:

$$V_{mod}(r) = \begin{pmatrix} V_{mod}(R^*), r < R^* \\ V_{mod}(r), r \geq R^* \end{pmatrix}$$

where r denotes a distance between the neighboring particles, and $R^*$ denotes a preset threshold value for preventing divergence of the energy values of the neighboring particle pairs.

2. The system: for image analysis of claim 1, further comprising an image acquisition unit configured to acquire an image of the sample.

3. The system for image analysis of claim 2, wherein the image acquisition unit includes one of a scanning electron microscope (SEM), an atomic force microscope (AFM) and an optical microscope.

4. The system for image analysis of claim 1, further comprising a data display configured to display a positional degree of randomness of particles.

5. A system for image analysis comprising:
a detector configured to receive an image of a sample, isolate particles from a background image of the sample image and detect positions of the isolated particles;
a first operator configured to calculate a static degree of randomness values of the particles using Lennard-Jones potentials based on the detected positions; and
a second operator configured to obtain a dynamic degree of randomness values of particles based at least in part on the sum of tensile forces between particles by implicit integration added until the particles reach a dynamic equilibrium, and calculate a positional degree of randomness of particles based at least in part on subtraction of the dynamic degree of randomness values from the static degree of randomness values,
wherein the detector is configured to obtain Voronoi regions based at least in part on a Voronoi Tessellation algorithm performed on the entire region of the sample with respect to the respective particles, and obtain a set of pairs of the nearest neighboring particles based on a Delaunay triangulation algorithm performed on the Voronoi regions, and
wherein the first operator is configured to calculate energy values of the pairs of neighboring particles based at least in part on the Lennard-Jones potential equation $V_{mod}(r)$:

$$V_{mod}(r) = \begin{pmatrix} V_{mod}(R^*), r < R^* \\ V_{mod}(r), r \geq R^* \end{pmatrix}$$

where r denotes a distance between the neighboring particles, and $R^*$ denotes a preset threshold value for preventing divergence of the energy values of the neighboring particle pairs.

6. The system for image analysis of claim 5, wherein the first operator is configured to obtain the sum of the energy values of neighboring particle pairs as a static degree of randomness value of particles.

7. The system for image analysis of claim 5, wherein the threshold value is a mean radius value of particles.

8. The system for image analysis of claim 5, wherein the threshold value is
preset to be in a range of $$\frac{\sigma}{8} \text{ to } \frac{\sigma}{2},$$

and wherein $\sigma$ denotes the equilibrium distance between particles.

9. The system for image analysis of claim 8, wherein the first operator is configured to determine the equilibrium distance between particles based at least in part on the following equation:

$$\sigma = \sqrt{\frac{I_{WL} \times I_{HL}}{P_N^2}}$$

where $I_{WL}$ denotes the width of the sample image, $I_{HL}$ denotes the height of the sample image, and $P_{N^2}$ denotes the number of particles in the sample image.

10. The system for image analysis of claim 1, wherein the second operator is configured to define a tensile force ($f^T$) between particles based at least in part on the following tensile force equations:

$$f^T = k_T(\|x_{ij}\| - l_0)\frac{x_{ij}}{\|x_{ij}\|},$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2},$$

$$\frac{\partial f^T}{\partial v_j} = 0,$$

and
wherein the second operator is further configured to calculate the sum of tensile forces by applying the tensile force equations to the following governing equation of implicit integration:

$$\left(M - h\frac{\partial f}{\partial v} - h^2 \frac{\partial f}{\partial x}\right)\Delta v = h\left(f_0 + h\frac{\partial f}{\partial x} v_0\right)$$

where M denotes a diagonal matrix of (3n ×3n) having masses of particles as elements, f denotes a (3n ×1) vector having forces of particles as elements, v denotes a (3n ×1) vector having speeds of particles as elements, x denotes a (3n ×1) vector having positions of particles as elements, $l_0$ denotes an equilibrium distance, $k_T$ denotes a spring constant, and h denotes a time step.

11. A method of image analysis comprising:
receiving an image of a sample;
isolating particles from a background image of the sample image;
detecting positions of the isolated particles;
calculating a static degree of randomness values of particles using Lennard-Jones potentials based on the detected positions of the particles;
obtaining a dynamic degree of randomness values of particles based on the sum of tensile forces between particles by implicit integration added until the particles reach dynamic equilibrium; and
calculating a positional degree of randomness of particles based on subtraction of the dynamic degree of randomness values from the static degree of randomness values,
wherein the calculating of the static degree of randomness values of particles comprises calculating energy values of a set of pairs of the nearest neighboring particles based at least in part on the Lennard-Jones potential equation $V_{mod}$ (r):

$$V_{mod}(r) = \begin{pmatrix} V_{mod}(R^*), r < R^* \\ V_{mod}(r), r \geq R^* \end{pmatrix}$$

where r denotes a distance between the neighboring particles, and R* denotes a preset threshold value for preventing divergence of the energy values of the neighboring particle pairs.

12. The method of claim 11, before the receiving, further comprising acquiring the sample image via one of a scanning electron microscope (SEM), an atomic force microscope (AFM) and an optical microscope.

13. The method of claim 11, between the detecting and the calculating of the static degree, further comprising:
obtaining Voronoi regions with the use of a Voronoi Tessellation algorithm performed on the entire region of the sample for the respective particles; and
obtaining the set of pairs of the nearest neighboring particles based on a Delaunay triangulation algorithm performed on the Voronoi regions.

14. A method of image analysis comprising:
receiving an image of a sample;
isolating particles from a background image of the sample image;
detecting positions of the isolated particles;
obtaining Voronoi regions with the use of a Voronoi Tessellation algorithm performed on the entire region of the sample for the respective particles;
obtaining a set of pairs of the nearest neighboring particles based on a Delaunay triangulation algorithm performed on the Voronoi regions;
calculating a static degree of randomness values of particles using Lennard-Jones potentials based on the detected positions of the particles; obtaining a dynamic degree of randomness values of particles based on the sum of tensile forces between particles by implicit integration added until the particles reach dynamic equilibrium; and
calculating a positional degree of randomness of particles based on subtraction of the dynamic degree of randomness values from the static degree of randomness values,
wherein the calculating of the static degree comprises calculating energy values of the pairs of neighboring particles based at least in part on the Lennard-Jones potential equation $V_{mod}$ (r):

$$V_{mod}(r) = \begin{pmatrix} V_{mod}(R^*), r < R^* \\ V_{mod}(r), r \geq R^* \end{pmatrix}$$

where r denotes a distance between the neighbor particles, and R* denotes a preset threshold value for preventing divergence of the energy values of the neighbor particle pairs.

15. The method of claim 14, wherein the calculating of the static degree comprises obtaining the sum of the energy values of neighboring particle pairs as a static degree of randomness value of particles.

16. The method of claim 14, wherein the threshold value is a mean radius value of particles.

17. The method of claim 14, wherein the threshold value is preset to be in a range of $$\frac{\sigma}{8} \text{ to } \frac{\sigma}{2},$$

and wherein σ denotes an equilibrium distance between particles.

18. The method of claim 17, wherein the equilibrium distance between particles is determined based at least in part on the following equation:

$$\sigma = \sqrt{\frac{I_{WL} \times I_{HL}}{P_N^2}}$$

where $I_{WL}$ denotes the width of the sample image, $I_{HL}$ denotes the height of the sample image and $P_{N^2}$ denotes the number of particles in the sample image.

19. A method of image analysis comprising:
receiving an image of a sample;
isolating particles from a background image of the sample image;
detecting positions of the isolated particles;
calculating a static degree of randomness values of particles using Lennard-Jones potentials based on the detected positions of the particles; obtaining a dynamic degree of randomness values of particles based on the sum of tensile forces between particles by implicit integration added until the particles reach dynamic equilibrium; and
calculating a positional degree of randomness of particles based on subtraction of the dynamic degree of randomness values from the static degree of randomness values,
wherein the obtaining of the dynamic degree comprises defining a tensile force ($f^T$) between particles based at least in part on the following tensile force equations:

$$f^T = k_T(\|x_{ij}\| - l_0)\frac{x_{ij}}{\|x_{ij}\|},$$

$$\frac{\partial f^T}{\partial x_j} = k_T \frac{(\|x_{ij}\| - l_0)}{\|x_{ij}\|} I_{33} + k_T \frac{l_0}{\|x_{ij}\|} I_{33} \frac{x_{ij} \cdot x_{ij}^T}{\|x_{ij}\|^2},$$

$$\frac{\partial f^T}{\partial v_j} = 0,$$

and
calculating the sum of tensile forces by applying the tensile force equations to the following equation of implicit integration:

$$\left(M - h\frac{\partial f}{\partial v} - h^2 \frac{\partial f}{\partial x}\right)\Delta v = h\left(f_0 + h\frac{\partial f}{\partial x} v_0\right)$$

where M denotes a diagonal matrix of 3n×3n having masses of particles as elements, denotes a 3n×1 vector having forces of particles as elements, v denotes a 3n×1 vector having speeds of particles as elements, x denotes a 3n×1 vector having positions of particles as elements, $l_0$ denotes an equilibrium distance, $k_T$ denotes a spring constant, and h denotes a time step.

20. One or more processor-readable storage devices having pocessor-readable code embodied on the processor-readable storage devices, the processor-readable code for programming one or more processors to perform a method of image analysis, wherein the method comprises:
receiving an image of a sample;
isolating particles from a background image of the sample image;
detecting positions of the isolated particles;
calculating a static degree of randomness values of particles using Lennard-Jones potentials based on the detected positions of the particles; obtaining a dynamic degree of randomness values of particles based on the sum of tensile forces between particles by implicit integration added until the particles reach dynamic equilibrium; and
calculating a positional degree of randomness of particles based on subtraction of the dynamic degree of randomness values from the static degree of randomness values,
wherein the calculating of the static degree of randomness values of particles comprises calculating energy values of a set of pairs of the nearest neighboring particles based at least in part on the Lennard-Jones potential equation $V_{mod}(r)$:

$$V_{mod}(r) = \begin{pmatrix} V_{mod}(R^*), & r < R^* \\ V_{mod}(r), & r \geq R^* \end{pmatrix}$$

where r denotes a distance between the neighboring particles, and R* denotes a preset threshold values for preventing divergence of the energy values of the neighboring particle pairs.

* * * * *